United States Patent [19]

Nissim

[11] Patent Number: 5,895,904
[45] Date of Patent: Apr. 20, 1999

[54] MAGNETIC INK CHARACTER RECOGNITION ENCODER UTILIZING A DOT MATRIX PRINTER HEAD AND PLURALITY OF SENSORS FOR DETECTING, ACTIVATING, AND CONTROLLING THE SPEED OF THE MEDIA

[75] Inventor: Yosi Nissim, West Hills, Calif.

[73] Assignee: Y. Nissim Coporation, Chatsworth, Calif.

[21] Appl. No.: 08/863,826

[22] Filed: May 27, 1997

[51] Int. Cl.⁶ .................................................. G06K 5/00
[52] U.S. Cl. .......................... 235/380; 235/449; 235/493
[58] Field of Search ................................. 235/380, 449, 235/493

[56] References Cited

U.S. PATENT DOCUMENTS

| | | | |
|---|---|---|---|
| 3,985,998 | 10/1976 | Crafton | 235/61.7 |
| 3,990,558 | 11/1976 | Ehrat | 194/4 |
| 4,560,293 | 12/1985 | McCumber et al. | 400/61 |
| 4,597,330 | 7/1986 | Hill et al. | 235/379 |
| 4,624,588 | 11/1986 | Bivin | 400/105 |
| 4,630,201 | 12/1986 | White | 364/408 |
| 4,731,524 | 3/1988 | Brooks | 235/432 |
| 4,774,513 | 9/1988 | Bonnaval-Lamothe | 340/825 |
| 4,851,655 | 7/1989 | Stone et al. | 235/58 |
| 5,053,607 | 10/1991 | Carlson et al. | 235/379 |
| 5,204,881 | 4/1993 | Cardini et al. | 375/60 |
| 5,491,325 | 2/1996 | Huang et al. | 235/379 |

FOREIGN PATENT DOCUMENTS

| | | |
|---|---|---|
| 472-255-A | 2/1992 | European Pat. Off. |
| 40-4243-497 | 1/1991 | Japan . |

*Primary Examiner*—Anita Pellman Gross
*Assistant Examiner*—Diane I. Lee
*Attorney, Agent, or Firm*—Thomas I. Rozsa; Tony D. Chen; Jerry Fong

[57] ABSTRACT

A magnetic ink character recognition (MICR) encoder device which is used for processing checks. The MICR encoder utilizes a dot matrix printer head for printing numerical information on checks. The MICR encoder comprises a self-contained housing for housing a guiding assembly, a transporting assembly, a detection assembly, a printing assembly, a microprocessor, and a stepper motor. The printing assembly includes a ribbon cartridge and a dot matrix printer head coupled to the ribbon cartridge for printing characters on the check. The dot matrix printer head has an extended head portion with nine tip wires thereon, where the characters are printed continuously on the check while the check is traveling through the guide assembly, thereby eliminating the need to stop the check for printing as taught by prior art MICR encoder devices.

23 Claims, 5 Drawing Sheets

MAGNETIC INK CHARACTER RECOGNITION ENCODER UTILIZING A DOT MATRIX PRINTER HEAD AND PLURALITY OF SENSORS FOR DETECTING, ACTIVATING, AND CONTROLLING THE SPEED OF THE MEDIA

BACKGROUND OF THE INVENTION

1. Field of the Invention

The present invention generally relates to the field of electronic devices used in the banking industry for processing batch checks. More particularly, the present invention relates to the field of check encoding machines used for printing numerical information on the bottom of the checks as they are being processed.

2. Description of the Prior Art

Magnetic ink character recognition (MICR) encoder devices are well known in the art. These prior art MICR encoder devices are used for printing numerical information on the bottom of checks as they are being processed by the encoder devices. These devices are known in the industry as a micr-encoder, batch-encoder, exception item encoder or proof machine. In a conventional MICR encoder device, the encoding of the numerical information on the check is done through a font wheel which requires the check to be advanced through the device in an intermittent stop mode arrangement for printing so that the font wheel can engrave the characters onto the check. The disadvantage with prior art MICR encoder devices is that it utilizes a font wheel for printing, in which the characters are engraved onto the check and cause the check to be advanced in an intermittent stop mode arrangement.

The following nine (9) prior art patents are found to be pertinent to the field of the present invention:

1. U.S. Pat. No. 3,985,998 issued to Crafton on Oct. 12, 1976 for "Personal Authority Verification System" (hereafter the "Crafton Patent");
2. U.S. Pat. No. 3,990,558 issued to Ehrat on Nov. 9, 1976 for "Method And Apparatus For Preparing And Assessing Payment Documents" (hereafter the "Ehrat Patent");
3. U.S. Pat. No. 4,630,201 issued to White on Dec. 16, 1986 for "On-Line And Off-Line Transaction Security System Using A Code Generated From A Transaction Parameter And A Random Number" (hereafter the "White Patent");
4. U.S. Pat. No. 4,774,513 issued to Bonnaval-Lamothe et al. on Sep. 27, 1988 for "Process For Controlling The Use Of Documents And Means For Implementing This Process" (hereafter the "Bonnaval-Lamothe Patent");
5. U.S. Pat. No. 5,053,607 issued to Carlson et al. on Oct. 1, 1991 for "Point-Of-Sale Device Particularly Adapted For Processing Checks" (hereafter the "Carlson Patent");
6. U.S. Pat. No. 5,204,881 issued to Cardini et al. on Apr. 20, 1993 for "System For Set-Up Of Transmitters In High Capacity Digital Radio Links" (hereafter the "Cardini Patent");
7. U.S. Pat. No. 5,491,325 issued to Huang et al. on Feb. 13, 1996 for "Method And System For Payment And Payment Verification" (hereafter the "Huang Patent");
8. European Patent No. 472-255-A (hereafter the "European Patent"); and
9. Japanese Patent No. 40-4243497 (hereafter the "Japanese Patent").

The Crafton Patent discloses a personal authority verification system. The Crafton Patent uses output signals from a transformation matrix which is used to drive a printer which prints an array of marks and spaces on the check blank, the array being the encipherment of the check number and its corresponding alphabet display providing thereby codes of authenticity and authority.

The Ehrat Patent discloses a method and apparatus for preparing and assessing payment documents. It comprises a printing mechanism which prints optically detectable numerals on the document. The printing mechanism could be a magnetic head for writing data on the document in the appropriately encoded form on a magnet track or it could be a perforater punching the data in an appropriate encoded form in the document.

The White Patent discloses an on-line and off-line transaction security system using a code generated from a transaction parameter and a random number.

The Bonnaval-Lamothe Patent discloses a process for controlling the use of documents and means for implementing this process.

The Carlson Patent discloses a point-of-sale device particularly adapted for processing checks. It comprises a MICR read head means, printer means and keypad means which feed information into a CPU which communicates with the customer's bank and the retailer's bank in order to transfer funds from the account of the customer to the account of the retailer. The printer means includes a document printer head which is associated with a printer head drive means which propels the printer head.

The Cardini Patent discloses a system for set-up of transmitters in high capacity digital radio links, in which a digital signal with quadrature amplitude modulation is transmitted over a radio frequency carrier wave.

The Huang Patent discloses a method and system for payment and payment verification. It comprises the imprinting of a bar code on the face of a payment document. The bar code serves as an index to a corresponding data file in a database which can be communicated to a drawee banking institution serving as broker for the funds as identified in the check so that the institution has prior knowledge of information relating to the check.

The European Patent discloses a device for reading an identification mark from a moving object. It comprises a reader for scanning the identification mark at a predetermined location. A reading time control unit receives an inked reading signal from a preceding identification mark. It inhibits the reading operation of the reader. The time duration corresponds a distance shorter than the distance required for a succeeding identification mark reaching the read position.

The Japanese Patent discloses an automatic check dealing system.

It is highly desirable to have a very efficient and also very effective design and construction of a magnetic ink character recognition (MICR) encoder device utilizing a dot matrix printer head for printing numerical information on checks. It is desirable to provide an MICR encoder device with the capability of continuous printing without having the check stop for printing the numerical information on the check. It is also desirable to provide an MICR encoder device that can print at high speeds in a much more efficient way than prior art MICR encoder devices.

SUMMARY OF THE INVENTION

The present invention is a magnetic ink character recognition (MICR) encoder device for processing checks. The MICR encoder device utilizes a dot matrix printer head for printing numerical information on checks. The MICR encoder device comprises a self-contained housing for housing a guiding means, a transporting means, a detection means, a printing means, a microprocessor, a transport stepper motor, and a print stepper motor.

The guiding means includes an inner side track, an outer side track located adjacent to and parallel to the inner side track, and a support base plate. The inner and outer side tracks provide a narrow gap therebetween for accommodating the check to advance in an upright direction.

The transporting means includes a plurality of spaced apart drive pulley wheels which extend through the inner side track, a plurality of spaced apart free idler wheels which extend through the outer side track and respectively correspond with the plurality of drive pulley wheels, where the pulley and idler wheels advance the check within the guiding means.

The printing means includes a ribbon cartridge and a dot matrix printer head coupled to the ribbon cartridge for printing characters on the check. The dot matrix printer head has an extended head portion with nine tip wires thereon, where the head portion extends through the outer track of the guide means.

The detection means includes a first pair of sensors, a second pair of sensors, a third pair of sensors, a fourth pair of sensors, and a fifth pair of sensors. The first sensors detect the check at a first location on the guiding means and transmit a signal to the microprocessor which in turn transmits a signal to the transport stepper motor to activate all of the plurality of drive pulley wheels for moving the check past the first location on the guiding means. The second and third sensors detect a dog ear on the check at a second location such that when the dog ear is detected, the second and third sensors transmit a signal to the microprocessor which in turn transmits a signal to a solenoid to disengage the first one of the plurality of free idler wheels from the check. The second and third sensors further transmit a signal to the transport stepper motor to reverse direction of all of the plurality of drive pulley wheels so that the check is backed-off from the second location on the guiding means for an operator to remove the dog ear on the check. The fourth sensors detect the check at a third location on the guiding means and transmit a signal to the microprocessor which in turn transmits a signal to the print stepper motor to activate the printing means so that the dot matrix printer head begins printing characters on the check. The fifth sensors detect the check at a fourth location on the guiding means and transmit a signal to the microprocessor which in turn transmits a signal to the transport stepper motor to reduce the eject speed to the print speed to accept another check at the first location.

An alpha/numerical keypad is used for transmitting information to the microprocessor which in turn transmits information to the printing means, which in turn activates the dot matrix printer head to print the information onto the check. In addition, the MICR encoder device further has means for electrically and electronically connecting the transporting means, the detection means, the printing means, and the stepper motor to the microprocessor.

The characters are printed continuously on the check while the check is traveling through the guide means, thereby eliminating the need to stop the check for printing as taught by prior art MICR encoder devices.

It is an object of the present invention to provide an MICR encoder device which includes a dot matrix printer head such that the characters can be printed on a negotiable instrument while it is traveling through the encoder device, thereby providing a continuous printing mode instead of an intermittent printing stop mode as taught by prior art encoder devices.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
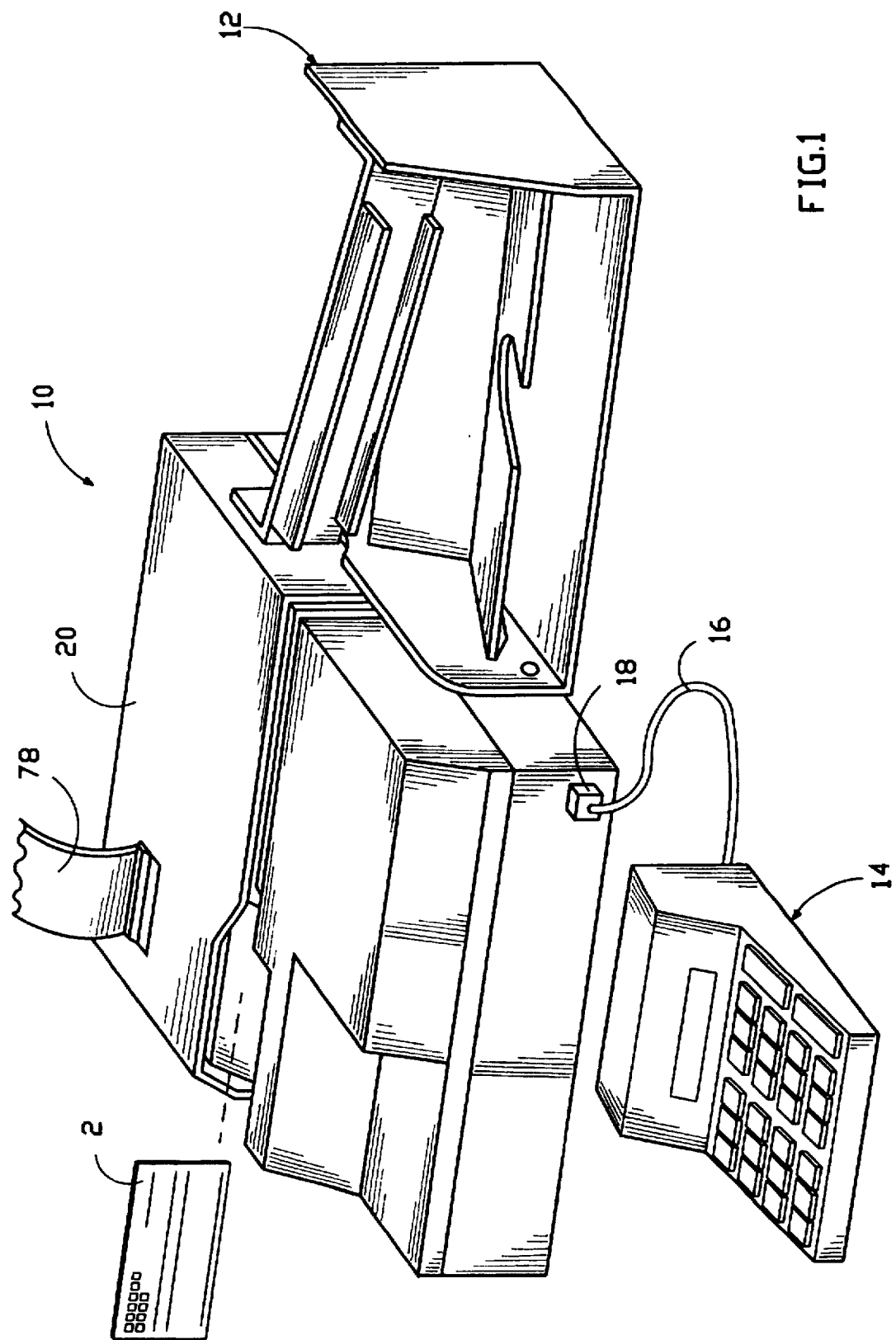
FIG. 1 is a perspective view of a preferred embodiment of the present invention magnetic ink character recognition (MICR) encoder device, showing a document stacker and an alpha/numerical keypad.

Referring to FIG. 1, there is shown at 10 the present invention magnetic ink character recognition (MICR) encoder device for processing negotiable instruments, such as a check 2, which may be dropped into the left side of the encoder device 10 for processing the check 2. The MICR encoder device 10 may also include a document stacker 12 for receiving the processed checks from the encoder device, and an alpha/numerical keypad 14 for manually entering the information to the encoder device or used for programing the encoder device to process the checks. The stacker 12 is attached to a right side of the encoder device 10 as shown. The keypad 14 is electrically and electronically connected to the encoder device 10 by a cable 16, where one end of the cable is connected to the keypad 14 and the other end has a connector 18 for connecting to the encoder device 10. The cable 16 is of sufficient length for allowing an operator a great deal of latitude in locating the keypad 14 for convenient use.

As the operator keys in the appropriate information, it is preferably displayed digit for digit/stroke-for-stroke at a display window depicted on the keypad 14. Thus, if the operator, while watching the entry on the display window, notices a mistake, he or she can cancel his or her entry by pressing a "CANCEL ERROR" button located on the keypad and begin again. When the operator has entered the proper digits on the keypad, the operator can push an "OK" button to start the sequence on the encoder device 10.

Figure 2:
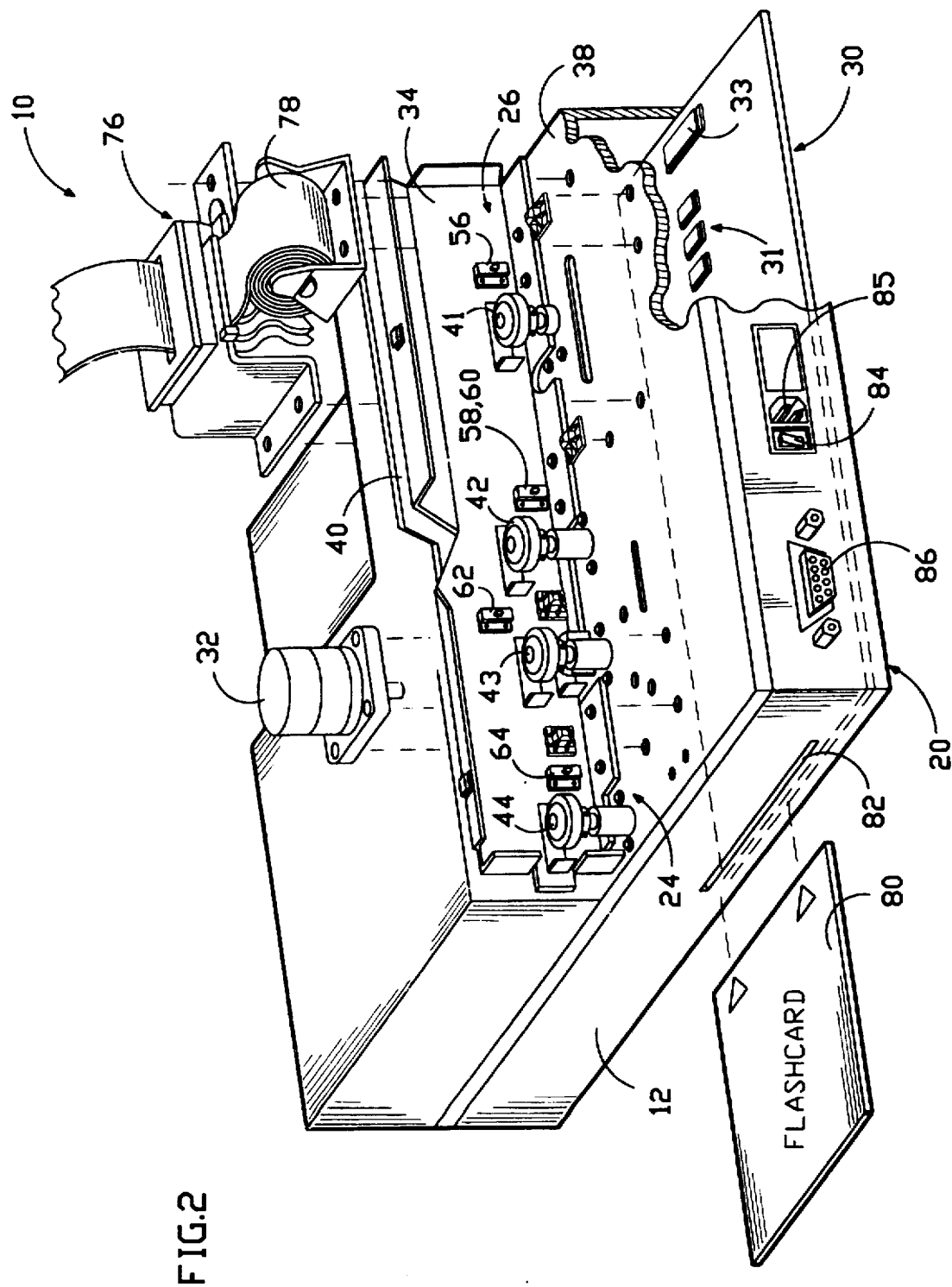
FIG. 2 is a partial cutout rear perspective view of the present invention MICR encoder device with the rear cover detached from the housing.
Figure 3:
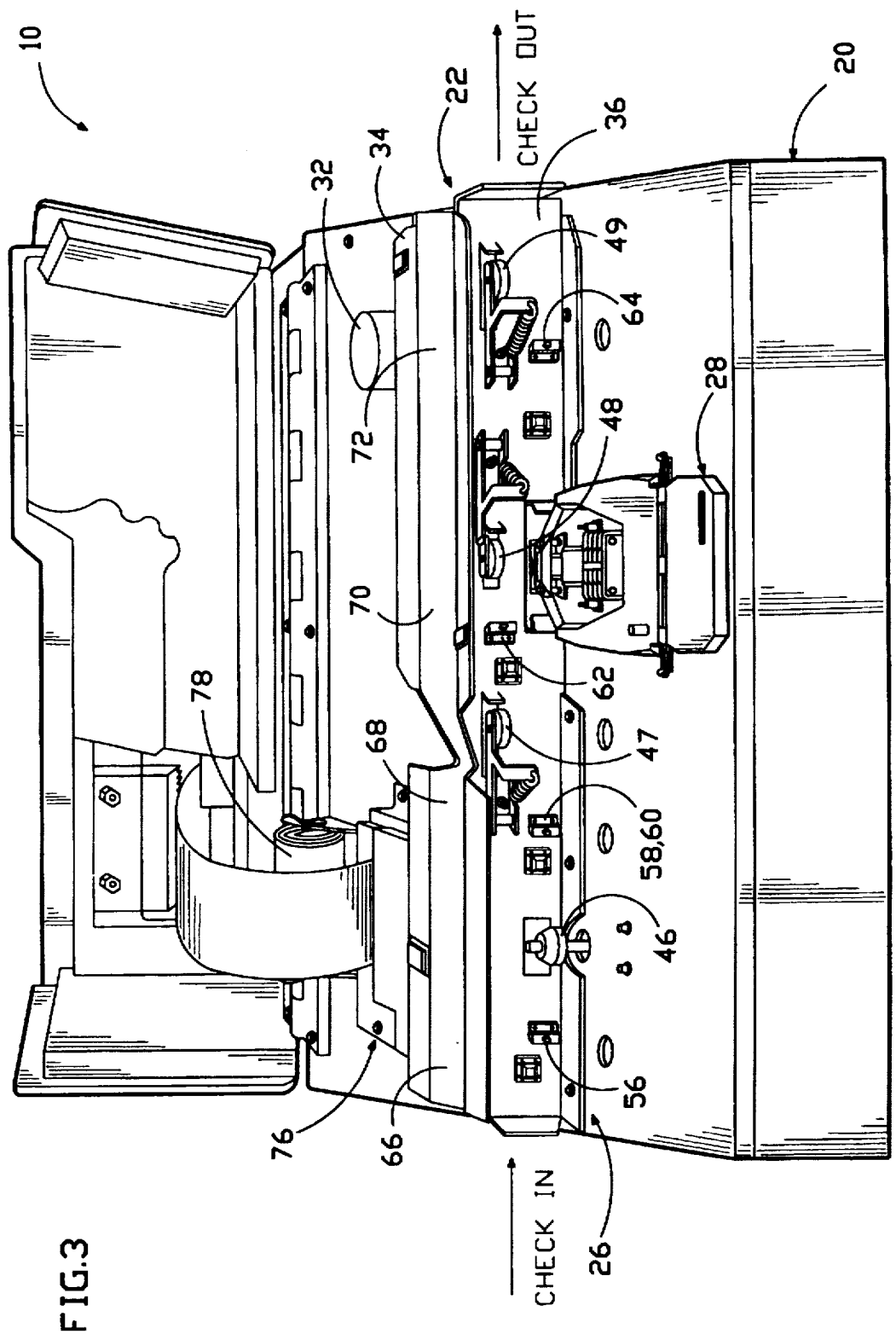
FIG. 3 is a front perspective view of the present invention MICR encoder device with the front cover opened.
Figure 4:
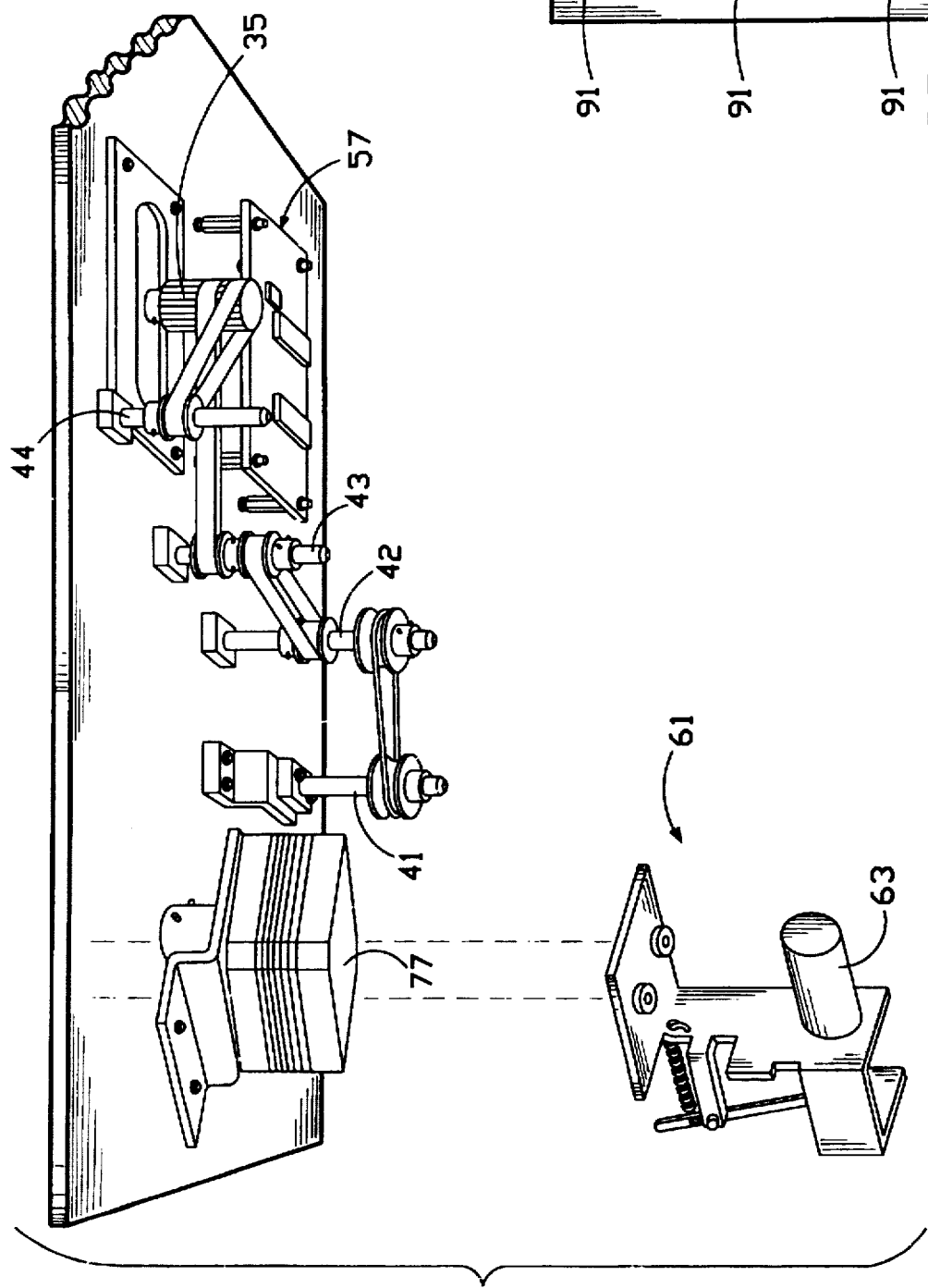
FIG. 4 is a bottom perspective view of the present invention MICR encoder device showing the pulley assemblies and a control solenoid mechanism.

Referring to FIGS. 2, 3 and 4, the MICR encoder device 10 comprises a self-contained housing 20 for housing several assemblies, including but not limited to a guiding assembly 22, a transporting or advancing assembly 24, a detection assembly 26, a printing assembly 28, a printed circuit board (PCB) control means 30 (see FIG. 2), and a stepper motor 32, such as an electric motor.

Referring to FIG. 2, there is illustrated the PCB control means 30 which is electrically and electronically connected to the transporting assembly 24, the detection assembly 26, the printing assembly 28, and the stepper motor 32. The PCB control means 30 is housed in the rear of self-contained housing 20 of the MICR encoder device 10. The PCB control means 30 controls the sequence of the MICR encoder device 10. The PCB control means 30 may include supporting electrical circuit 31 and a microprocessor 33. The PCB control means 30 is conventional in the art, and the description thereof will not be discussed.

Referring to FIGS. 2 and 3, the guiding assembly 22 includes an inner vertical side track 34, an outer vertical side track 36 located adjacent to and parallel to the inner side track 34, and a horizontal support base plate 38. The inner and outer side tracks 34 and 36 provide a narrow slot 40 therebetween for accommodating the check 2 to advance through the slot 40 of the guiding assembly 22 in an upright direction.

It will be appreciated that the check is not limited in the vertical upright position for advancing through the slot 40 of the guiding assembly 22. It is emphasized that while the vertical upright position for the check is the preferred way of advancing the check therethrough, it is also within the spirit and scope of the present invention to have the check advance through the slot in a horizontal flat position, where the check is parallel to the support base plate 38 of the guiding assembly 22.

The transporting assembly 24 includes a plurality of spaced apart drive pulley wheels 41, 42, 43, and 44 extending through the inner side track 34 of the guiding assembly 22, a plurality of spaced apart free idler wheels 46, 47, 48, and 49 extending through the outer side track 36 of the guiding assembly 22 and correspond with the plurality of pulley wheels 41, 42, 43, and 44 respectively, where the pulley and idler wheels advance the check 2 in the slot 40 therein and within the guiding assembly 22. One of the plurality of idler wheels 46 has its own control solenoid mechanism 61, where the control mechanism 61 is located at the bottom of the housing 20 and adjacent to a ribbon stepper motor 77 (see FIG. 4). The control mechanism 61 may include a solenoid 63 which deactivates the idle wheel 45 from engaging with the drive pulley wheel 41.

Figure 5:
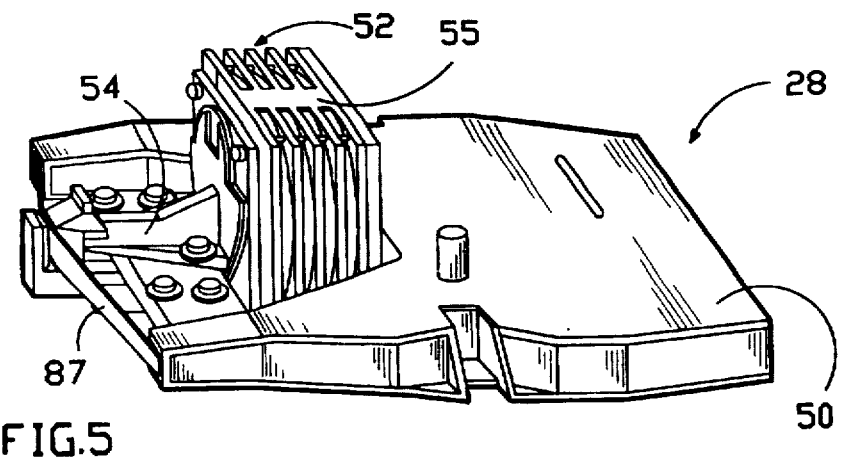
FIG. 5 is a perspective view of the printing assembly of the present invention MICR encoder device.
Figure 6:
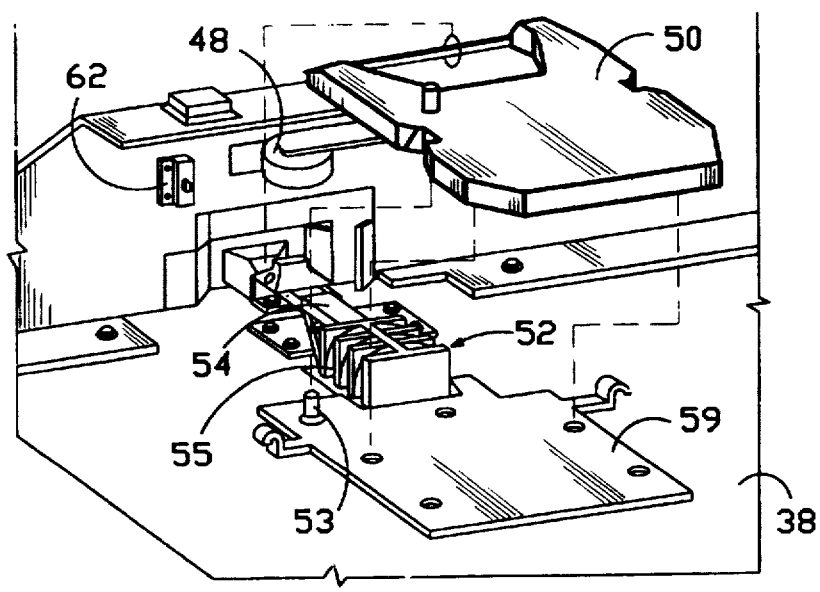
FIG. 6 is a partial perspective view of the printing assembly being connected to the housing of the present invention MICR encoder device.

Referring to FIGS. 5 and 6, there is shown the printing assembly 28 which includes a mounting plate 59 mounted to the support base plate 38, a ribbon cartridge 50 mounted to the mounting plate 59, and a dot matrix printer head 52 coupled to the ribbon cartridge 50 for printing characters on the check 2. The ribbon cartridge 50 has a ribbon tape 87 which moves within the cartridge in a right to left direction.

Once the ribbon cartridge 50 is in position, it is located adjacent to the outer side track 36. The dot matrix printer head 52 has an extended head portion 54 and a body portion 55, where the extended head portion 54 extends through the outer side track 36 for printing characters onto the checks. The dot matrix printer head 52 is shown in association with a drive means 53 connected to the ribbon stepper motor 77 (see FIG. 4) and engaged with the ribbon cartridge 50, which propels the ribbon tape 87 in a preferred, customary lateral direction. To optimize motion efficiency, it is preferred that the check will not have to stop to print the characters on the check while it is printing.

Figure 7:
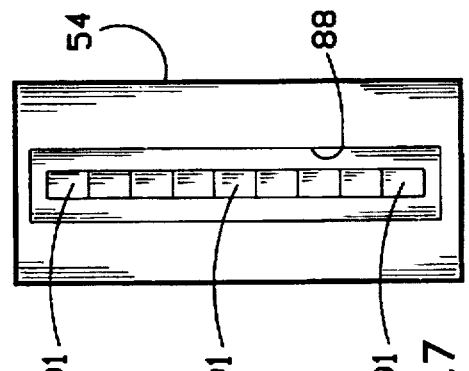
FIG. 7 is an end view of the dot matrix printer head of the printing assembly.
Figure 8:
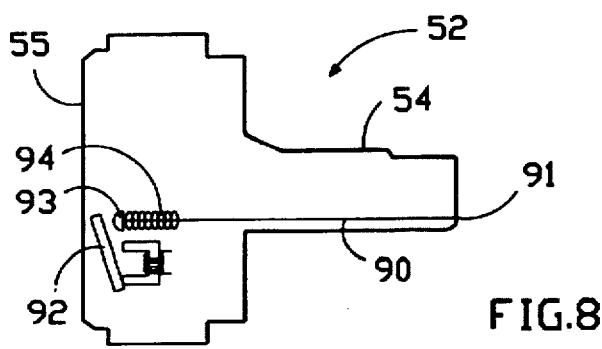
FIG. 8 is an illustration of the dot matrix printer head of the printing assembly.

Referring to FIGS. 5, 6, 7 and 8, the extended head portion 54 has an open end 88 and nine wires 90 (only one is depicted in FIG. 8) enclosed by the head portion 54. Each wire 90 has a tip end 91 which has a rectangular cross-section and are stacked on top of each other as illustrated in FIG. 7. There are provided nine armatures 92 (only one is depicted in FIG. 8) which are installed in the body portion 55 of the dot matrix printer head 52 and correspond with the nine wires 90 respectively. Each armature 92 moves down and presses on a plastic head 93 of each wire 90, which overcomes a spring force 94 to move each tip end 91 of each wire 90 forward out from the open end 88 of the head portion 54 of the dot matrix printer head 52, thereby pressing the ribbon tape 87 on the negotiable instrument 2 to print a character thereon.

Referring to FIGS. 2, 3 and 6, the detection assembly 26 is located on the guiding assembly 22 and includes a pair of opposite first sensors 56, a pair of opposite second sensors 58, a pair of opposite third sensors 60, a pair of opposite fourth sensors 62, and a pair of opposite fifth sensors 64. All of these sensors are mounted onto the inner and outer side tracks 34 and 36 of the guiding assembly 22 respectively and extend therethrough.

The check 2 is first manually introduced into the housing 20 of the encoder device 10 by sliding it in through the slot 40 of the guiding assembly 22. The arrows which are represented as "CHECK IN" and "CHECK OUT" depict the preferred direction of the check movement through the encoder device 10 (see FIG. 3). When the check has been moved far enough into the encoder device 10, it preferably encounters and then trips the first sensors 56 causing contact (or lack thereof) and thereby alerting the microprocessor 33 on the PCB control means 30 to begin a programmed cycle of the encoder device 10. The microprocessor 33 signals the stepper motor 32 to operate the transporting assembly 24, such as the plurality of drive pulley wheels 41, 42, 43 and 44, and thereby draws the check across the guiding assembly 22. The counter rotating motion of the drive pulley wheels 41, 42, 43 and 44, and free idle wheels 46, 47, 48 and 49 cause a pinching and drawing action which propel the check or other negotiable instrument through the slot 40 of the guiding assembly 22 of the encoder device 10.

As noted above, once main switch means 84 (see FIG. 2) is turned "ON", the check is drawn or pulled into the device by the action of the stepper motor 32 which mechanically drives (via drive means 35 shown in FIG. 4, which is known in the art) all of the pulley wheels 41, 42, 43 and 44. The pulley wheels 41, 42, 43, 44 touch and in turn drive respective free idle wheels 46, 47, 48, 49 and thereby rotate them in the opposite rotational direction. Operating in concert, the counter-rotating action of the pulley wheels propels the check through the slot provided by the guiding assembly 22 on the encoder device 10 at appropriate speeds, times and distances which are controlled by the microprocessor or other appropriate control means known to this art.

The main switch 84 controls the flow of AC current to the encoder device 10. A power plug 85 is provided with the encoder device 10 for delivering power to the device 10.

Referring to FIGS. 2, 3 and 4, the first sensors 56 detect the check 2 at a first or beginning location 66 on the guiding assembly 22 and transmit a signal to the microprocessor 33 on the PCB 30, which in turn transmits a signal to the stepper motor 32 to activate all of the plurality of pulley wheels 41, 42, 42 and 44 for moving the check 2 past the first location 66 on the guiding assembly 22. In addition, the microprocessor 33 also activates the control mechanism 61 which controls the idler wheel 46 to rotate in a counter-rotating action of the drive pulley wheel 41.

The second and third sensors 58 and 60 are spaced from the first sensors 56 for detecting a dog ear on the check 2 at a second or dog location 68 such that when the dog ear is detected, the second and third sensors 58 and 60 transmit a signal to the microprocessor 33 which in turn transmits a signal to the stepper motor 32 to reverse direction of all of the plurality of pulley wheels 41, 42, 43, 44 so that the check 2 is backed-off from the first location 66 on the guiding assembly 22 so that an operator can remove the dog ear on the check 2. In addition, the microprocessor 33 also sends a signal to the control mechanism 61 which in turn commands the solenoid 63 which controls the idler wheel 46 to disengaged from the pulley wheel 41 so that the operator can remove the dog ear on the check 2. Once that is done, the operator restarts the cycle of the MICR encoder device 10. However, if the dog ear is not detected, the check advances past the second location 68 on the guiding assembly 22.

The fourth sensors 62 are spaced from the second 58 and third 60 sensors, and detect the check at a third or printing location 70 on the guiding assembly 22. The fourth sensors 62 transmit a signal to the microprocessor 33 which in turn transmits a signal to activate the printing assembly 28 so that the dot matrix printer head 52 begins printing characters on the check. After the last character is printed on the check 2, the microprocessor 33 transmits a signal to the stepper motor 32 to increase the speed of all of the plurality of drive pulley wheels 41, 42, 43 and 44 from a print speed to an eject speed for ejecting out the check from the guiding assembly 22 to the document stacker 12 (see FIG. 1). What is unique about this part of the procedure is that the characters or information is printed onto the check while the check is still traveling through the guiding assembly 22, thereby providing a continuous printing mode instead of an intermittent stop mode as taught by the prior art encoder devices.

The fifth sensors 64 are mounted onto the inner and outer side tracks 34 and 36, and extend therethrough. The fifth sensors 64 are spaced from the fourth sensors 62 for detecting the check at a fourth or completed location 72 on the guide assembly 22. Once the fifth sensors 64 detect the trailing edge of the check at the fourth location 72, they transmit a signal to the microprocessor 33 which in turn transmits a signal to the stepper motor 32 to reduce the speed of the plurality of pulley wheels 41, 42, 43 and 44 from the eject speed to the print speed so that another check is positioned at the first location 66 to restart the sequence.

All of these sensors are conventional in the art and are electrically connected to the PCB 30 in a conventional way known to one skilled in the art. In addition, the MICR encoder device 10 is provided with means for electrically and electronically connecting the transporting assembly 24, the detection assembly 26, the printing assembly 28, and the stepper motor 32 to the PCB control means 30.

Referring to FIGS. 2 and 3, the MICR encoder device 10 further comprises a journal printer 76 for printing information on a roll of paper 78. A printed circuit board 57 is provided with the encoder device 10 for controlling the journal printer 76. The MICR encoder device 10 also comprises a memory card 80 or flashcard for storing information (see FIG. 2). The housing 20 of the MICR encoder device 10 is provided with a slot 82 for receiving the memory card 80. The memory card 80 may be provided with electrically conductive contact elements (not shown) for establishing communication between the card 80 and the encoder device 10 or any other suitable connecting means known to one skilled in the art may be utilized. The memory card 80 may be defined by a memory card having a battery augmented memory or a low power CMOS (complementary metal oxide semiconductor) random axis memory powered by a battery. The encoder device 10 further comprises an RS-232 communication connector 86 for connecting to an external computer (not shown). All of these devices above are conventional in the art and are electrically connected to appropriate components in the MICR encoder device 10 in a conventional way known to one skilled in the art.

It will be appreciated that the individual hardware elements discussed above are all available in various forms in the prior art. However, at the present time, there has been no MICR encoder device developed which combines a dot matrix printer head to permit the printing of characters or information onto a check in a continuous printing mode.

Defined in detail, the present invention is a magnetic ink character recognition (MICR) encoder for processing a check, the MICR encoder comprising: (a) a self-contained housing for housing a guiding assembly, a transporting assembly, a detection assembly, a printing assembly, a microprocessor, and a stepper motor; (b) said guiding assembly including a horizontal support base plate, an inner vertical side track mounted on the support base plate, and an outer vertical side track mounted on the support base plate and located adjacent to and parallel to the inner side track, the inner and outer side tracks providing a narrow slot therebetween for accommodating said check to advance in an upright direction; (c) said transporting assembly including a plurality of spaced apart drive pulley wheels extending through said inner side track, a plurality of spaced apart free idler wheels extending through said outer side track and corresponding with the plurality of pulley wheels respectively, where the pulley wheels and the idler wheels advance said check within said slot of said guiding assembly; (d) said printing assembly including a ribbon cartridge and a dot matrix printer head coupled to the ribbon cartridge for printing characters on said check, the dot matrix printer head having an extended head portion extending through said outer track of said guiding assembly and nine tip wires enclosed within the extended head portion for printing characters onto said check; (e) said detection assembly located on said inner and outer side tracks of said guiding assembly and including a first pair of opposite sensors, a second pair of opposite sensors, a third pair of opposite sensors, a fourth pair of opposite sensors, and a fifth pair of opposite sensors; (f) said first pair of sensors for detecting said check at a first location on said guiding assembly and transmitting a signal to said microprocessor which in turn transmits a signal to said stepper motor to activate all of said plurality of drive pulley wheels for moving said check past the first location on said guiding assembly; (g) said second and third pairs of sensors spaced from said first pair of sensors for detecting a dog ear on said check at a second location such that when the dog ear is detected, said second and third pairs of sensors transmit a signal to said microprocessor which in turn transmits a signal to said stepper motor to reverse direction of all of said plurality of drive pulley wheels so that said check is backed-off from said first location on said guiding assembly for an operator to remove the dog ear on said check, and when the dog ear is not detected, said check is advanced past the second location on said guiding assembly; (h) said fourth pair of sensors spaced from said second and third pairs of sensors for detecting said check at a third location on said guiding assembly and transmitting a signal to said microprocessor which in turn transmits a signal to activate said printing assembly so that said dot matrix printer head begins printing characters on said check in a continuous printing mode while said check is traveling through said slot on said guiding assembly, and when a last character is printed on said check, said microprocessor transmits a signal to said stepper motor to increase the speed of all of said plurality of drive pulley wheels from a print speed to an eject speed for ejecting out said check from said guiding assembly; (i) said fifth pair of sensors spaced from said fourth pair of sensors for detecting a trailing edge of said check at a fourth location on said guiding assembly and transmitting a signal to said microprocessor which in turn transmits a signal to said stepper motor to reduce the speed of all of said plurality of drive wheels from said eject speed to said print speed so that another check is positioned at said first location to advance through said slot on said guiding assembly; (j) an alpha/numerical keypad for transmitting information to said microprocessor which in turn transmits information to said printing assembly which in turn activates said dot matrix printer head to print the characters on said check; and (k) a means for electrically and electronically connecting said transporting assembly, said detection assembly, said printing assembly, and said stepper motor to said microprocessor.

Defined broadly, the present invention is a magnetic ink character recognition (MICR) encoder for processing a check, the MICR encoder comprising: (a) a housing for housing a guiding assembly, a transporting assembly, a detection assembly, a printing assembly, a control means, and a motor means; (b) said guiding assembly having a support plate, an inner track attached to the support plate, and an outer track attached to the support plate and located adjacent to and parallel to the inner track to form a gap therebetween for accommodating said check to advance through the gap of said guiding assembly; (c) said transporting assembly having a plurality of drive wheels extending through said inner track, a plurality of idler wheels extending through said outer track and corresponding with the plurality of drive wheels respectively, where the drive and idler wheels advance said check through said gap of said guiding assembly; (d) said printing assembly having a ribbon cartridge and a dot matrix printer head coupled to the ribbon cartridge for printing characters on said check, the dot matrix printer head having a head portion extending through said outer track of said guiding assembly and nine tip wires enclosed within the head portion for printing the characters on said check; (e) said detection assembly located on said guiding assembly and having a plurality of sensors; (f) a respective first one of said plurality of sensors for detecting said check at a beginning location on said guiding assembly and transmitting a signal to said control means which in turn transmits a signal to said motor means to activate all of said plurality of drive wheels for moving said check past the beginning location on said guiding assembly; (g) a respective second one of said plurality of sensors for detecting said check at a printing location on said guiding assembly and transmitting a signal to said control means which in turn transmits a signal to activate said printing assembly so that said dot matrix printer head begins printing the characters on said check in a continuous printing mode while said check is traveling through said gap on said guiding assembly, and when a last character is printed on said check, said control means transmits a signal to said motor means to increase the speed of all of said plurality of drive wheels from a print speed to an eject speed for ejecting out said check from said guiding assembly; (h) a respective third one of said plurality of sensors for detecting said check at a completed location on said guiding assembly and transmitting a signal to said control means which in turn transmits a signal to said motor means to reduce the speed of all said plurality of plurality of drive wheels from said eject speed to said print speed so that another check is positioned at said beginning location to advance through said gap on said guiding assembly; and (i) means for electrically and electronically connecting said transporting assembly, said detection assembly, said printing assembly, and said motor means to said control means.

Defined more broadly, the present invention is an encoder for processing a document, comprising: (a) a guiding assembly having a slot therebetween for accommodating said document to advance through the guiding assembly; (b) a transporting assembly having means for advancing said document within said slot of said guiding assembly; (c) a printing assembly having a dot matrix printer head for printing characters on said document; (d) a control means for electrically connecting to and controlling said transporting assembly, said printing assembly, and a motor means; (e) at least one first sensor for detecting said document at a beginning location on said guiding assembly and transmitting a signal to said control means which in turn transmits a signal to said motor means to activate said transporting assembly for advancing said document past the beginning location on said guiding assembly; (f) at least one second sensor for detecting said document at a printing location on said guiding assembly and transmitting a signal to said control means which in turn transmits a signal to activate said printing assembly so that said dot matrix printer head begins printing characters on said document in a continuous printing mode while said document is advancing through said slot on said guiding assembly, and when a last character is printed on said check, said control means transmits a signal to said motor means to increase the speed of said transporting assembly from a print speed to an eject speed for ejecting out said document from said guiding assembly; and (g) at least one third sensor for detecting said document at a completed location on said guiding assembly and transmitting a signal to said control means which in turn transmits a signal to said motor means to reduce the speed of said transporting assembly from said eject speed to said print speed so that another document is positioned at said beginning location on said guiding assembly to advance through said guiding assembly.

Defined even more broadly, the present invention is an encoder for processing a document, comprising: (a) an advancing assembly having means for advancing said document; (b) a printing assembly utilizing a dot matrix printing means for printing characters on said document in a continuous printing mode while said document is advancing through said encoder; and (c) a control means for electrically connecting to and controlling said advancing assembly and said printing assembly.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A magnetic ink character recognition (MICR) encoder for processing a check, the MICR encoder comprising:
   a. a self-contained housing for housing a guiding assembly, a transporting assembly, a detection assembly, a printing assembly, a microprocessor, and a stepper motor;
   b. said guiding assembly including a horizontal support base plate, an inner vertical side track mounted on a support base plate, and an outer vertical side track mounted on the support base plate and located adjacent to and parallel to the inner side track, the inner and outer side tracks providing a narrow slot therebetween for accommodating said check to advance in an upright direction;
   c. said transporting assembly including a plurality of spaced apart drive pulley wheels extending through said inner side track, a plurality of spaced apart free idler wheels extending through said outer side track and corresponding with the plurality of pulley wheels respectively, where the pulley wheels and the idler wheels advance said check within said slot of said guiding assembly;
   d. said printing assembly including a ribbon cartridge and a dot matrix printer head coupled to the ribbon cartridge for printing characters on said check, the dot matrix printer head having an extended head portion extending through said outer track of said guiding assembly and nine tip wires enclosed within a extended head portion for printing characters onto said check;
   e. said detection assembly located on said inner and outer side tracks of said guiding assembly and including a first pair of opposite sensors, a second pair of opposite sensors, a third pair of opposite sensors, a fourth pair of opposite sensors, and a fifth pair of opposite sensors;
   f. said first pair of sensors for detecting said check at a first location on said guiding assembly and transmitting a signal to said microprocessor which in turn transmits a signal to said stepper motor to activate all of said plurality of drive pulley wheels for moving said check past the first location on said guiding assembly;
   g. said second and third pairs of sensors spaced from said first pair of sensors for detecting a dog ear on said check at a second location such that when the dog ear is detected, said second and third pairs of sensors transmit a signal to said microprocessor which in turn transmits a signal to said stepper motor to reverse direction of all of said plurality of drive pulley wheels so that said check is backed-off from said first location on said guiding assembly for an operator to remove the dog ear on said check, and when the dog ear is not detected, said check is advanced past the second location on said guiding assembly;
   h. said fourth pair of sensors spaced from said second and third pairs of sensors for detecting said check at a third location on said guiding assembly and transmitting a signal to said microprocessor which in turn transmits a signal to activate said printing assembly so that said dot matrix printer head begins printing characters on said check in a continuous printing mode while said check is traveling through said slot on said guiding assembly, and when a last character is printed on said check, said microprocessor transmits a signal to said stepper motor to increase the speed of all of said plurality of drive pulley wheels from a print speed to an eject speed for ejecting out said check from said guiding assembly;
   i. said fifth pair of sensors spaced from said fourth pair of sensors for detecting a trailing edge of said check at a fourth location on said guiding assembly and transmitting a signal to said microprocessor which in turn transmits a signal to said stepper motor to reduce the speed of all of said plurality of drive wheels from said eject speed to said print speed so that another check is positioned at said first location to advance through said slot on said guiding assembly;
   j. an alpha/numerical keypad for transmitting information to said microprocessor which in turn transmits information to said printing assembly which in turn activates said dot matrix printer head to print the characters on said check; and
   k. means for electrically and electronically connecting said transporting assembly, said detection assembly, said printing assembly, and said stepper motor to said microprocessor.

2. The MICR encoder in accordance with claim 1 further comprising a memory card for storing information.

3. The MICR encoder in accordance with claim 1 further comprising a document stacker for receiving said processed check and attached to a side of said housing and located adjacent to said fifth pair of sensors.

4. The MICR encoder in accordance with claim 1 further comprising a journal printer for printing information on a roll of paper.

5. The MICR encoder in accordance with claim 1 wherein said stepper motor includes an electric motor.

6. A magnetic ink character recognition (MICR) encoder for processing a check, the MICR encoder comprising:
   a. a housing for housing a guiding assembly, a transporting assembly, a detection assembly, a printing assembly, a control means, and a motor means;
   b. said guiding assembly having a support plate, an inner track attached to the support plate, and an outer track attached to the support plate and located adjacent to and parallel to the inner track to form a gap therebetween for accommodating said check to advance through the gap of said guiding assembly;
   c. said transporting assembly having a plurality of drive wheels extending through said inner track, a plurality of idler wheels extending through said outer track and corresponding with the plurality of drive wheels respectively, where the drive and idler wheels advance said check through said gap of said guiding assembly;
   d. said printing assembly having a ribbon cartridge and a dot matrix printer head coupled to the ribbon cartridge for printing characters on said check, the dot matrix printer head having a head portion extending through said outer track of said guiding assembly and nine tip wires enclosed within the head portion for printing the characters on said check;
   e. said detection assembly located on said guiding assembly and having a plurality of sensors;

f. a respective first one of said plurality of sensors for detecting said check at a beginning location on said guiding assembly and transmitting a signal to said control means which in turn transmits a signal to said motor means to activate all of said plurality of drive wheels for moving said check past the beginning location on said guiding assembly;

g. a respective second one of said plurality of sensors for detecting said check at a printing location on said guiding assembly and transmitting a signal to said control means which in turn transmits a signal to activate said printing assembly so that said dot matrix printer head begins printing the characters on said check in a continuous printing mode while said check is traveling through said gap on said guiding assembly, and when a last character is printed on said check, said control means transmits a signal to said motor means to increase a speed of all of said plurality of drive wheels from a print speed to an eject speed for ejecting out said check from said guiding assembly;

h. a respective third one of said plurality of sensors for detecting said check at a completed location on said guiding assembly and transmitting a signal to said control means which in turn transmits a signal to said motor means to reduce the speed of all said plurality of plurality of drive wheels from said eject speed to said print speed so that another check is positioned at said beginning location to advance through said gap on said guiding assembly; and i. means for electrically and electronically connecting said transporting assembly, said detection assembly, said printing assembly, and said motor means to said control means.

7. The MICR encoder in accordance with claim 6 further comprising an alpha/numerical keypad for transmitting information to said control means which in turn transmits information to said printing assembly which in turn activates said dot matrix printer head to print the characters on said check.

8. The MICR encoder in accordance with claim 6 further comprising a memory card for storing information.

9. The MICR encoder in accordance with claim 6 further comprising a document stacker for receiving said processed check and attached to a side of said housing.

10. The MICR encoder in accordance with claim 6 further comprising a journal printer for printing information on a roll of paper.

11. The MICR encoder in accordance with claim 6 wherein said motor means includes an electric motor.

12. The MICR encoder in accordance with claim 6 wherein said motor means includes a stepper motor.

13. The MICR encoder in accordance with claim 6 wherein said detection assembly further includes means for detecting a dog ear on said check such that when the dog ear is detected, the dog ear means transmits a signal to said control means which in turn transmits a signal to said motor means to reverse direction of all of said plurality of drive wheels so that said check is backed-off from said beginning location on said guiding assembly for an operator to remove the dog ear on said check.

14. An encoder for processing a document, comprising:

a. a guiding assembly having a slot therebetween for accommodating said document to advance through the guiding assembly;

b. a transporting assembly having means for advancing said document within said slot of said guiding assembly;

c. a printing assembly having a dot matrix printer head for printing characters on said document;

d. a control means for electrically connecting to and controlling said transporting assembly, said printing assembly, and a motor means;

e. at least one first sensor for detecting said document at a beginning location on said guiding assembly and transmitting a signal to said control means which in turn transmits a signal to said motor means to activate said transporting assembly for advancing said document past the beginning location on said guiding assembly;

f. at least one second sensor for detecting said document at a printing location on said guiding assembly and transmitting a signal to said control means which in turn transmits a signal to activate said printing assembly so that said dot matrix printer head begins printing characters on said document in a continuous printing mode while said document is advancing through said slot on said guiding assembly, and when a last character is printed on said check, said control means transmits a signal to said motor means to increase a speed of said transporting assembly from a print speed to an eject speed for ejecting out said document from said guiding assembly; and g. at least one third sensor for detecting said document at a completed location on said guiding assembly and transmitting a signal to said control means which in turn transmits a signal to said motor means to reduce the speed of said transporting assembly from said eject speed to said print speed so that another document is positioned at said beginning location on said guiding assembly to advance through said guiding assembly.

15. The encoder in accordance with claim 14 further comprising a keypad for transmitting information to said control means which in turn transmits information to said printing assembly, which in turn activates said dot matrix printer head to print the characters on said document.

16. The encoder in accordance with claim 14 further comprising a memory card for storing information.

17. The encoder in accordance with claim 14 further comprising a document stacker for receiving said processed document.

18. The encoder in accordance with claim 14 further comprising a journal printer for printing information on a roll of paper.

19. The encoder in accordance with claim 14 further comprising means for detecting a dog ear on said document such that when the dog ear is detected, the detecting dog ear means transmits a signal to said control means which in turn transmits a signal to said motor means to reverse direction of said transporting assembly so that said document is backed-off from said beginning location on said guiding assembly for an operator to remove the dog ear from said document.

20. The encoder in accordance with claim 14 wherein said transporting assembly includes a plurality of drive wheels and a plurality of idler wheels corresponding with the plurality of drive wheels respectively, where the drive and idler wheels advance said document within said guiding assembly.

21. The encoder in accordance with claim 14 wherein said control means includes a microprocessor.

22. An encoder for processing a document, comprising:

a. an advancing assembly having means for advancing said document;

b. a printing assembly utilizing a dot matrix printing means for printing characters on said document in a continuous printing mode while said document is advancing through said encoder;

c. a control means for electrically connecting to and controlling said advancing assembly and said printing assembly;

d. a guiding assembly having a slot therebetween for accommodating said document to advance in the guiding assembly;

e. at least one first sensor for detecting said document at a beginning location on said guiding assembly and transmitting a signal to said control means which in turn transmits a signal to a motor means to activate said advancing assembly for advancing said document through said guiding assembly; and.

f. at least one second sensor for detecting said document at a printing location on said guiding assembly and transmitting a signal to said control means which in turn transmits a signal to activate said printing assembly so that said dot matrix printing means begins printing characters on said document in a continuous printing mode while said document is advancing through said guiding assembly, and when a last character is printed on said document said control means transmits a signal to said motor means to increase a speed of said advancing assembly from a print speed to an eject speed for ejecting out said document from said guiding assembly.

23. The encoder in accordance with claim 22 further comprising at least one third sensor for detecting said document at a completed location on said guiding assembly and transmitting a signal to said control means which in turn transmits a signal to said motor means to reduce the speed of said advancing assembly from said eject speed to said print speed so that another document is positioned at said beginning location on said guiding assembly to advance through said guiding assembly.

* * * * *